United States Patent
Shin (10) Patent No.: US 9,148,706 B1
(45) Date of Patent: Sep. 29, 2015

(54) IDENTIFICATION OF USER SEGMENTS BASED ON VIDEO VIEWERSHIP ACTIVITY AND ANALYSIS

(75) Inventor: Brian J. Shin, Boston, MA (US)

(73) Assignee: Visible Measures Corp., Boston, MA (US)

( * ) Notice: Subject to any disclaimer, the term of this patent is extended or adjusted under 35 U.S.C. 154(b) by 0 days.

(21) Appl. No.: 12/987,620

(22) Filed: Jan. 10, 2011

Related U.S. Application Data (60) Provisional application No. 61/293,327, filed on Jan. 8, 2010.

(51) Int. Cl.
| | |
|---|---|
| H04N 7/10 | (2006.01) |
| H04N 7/16 | (2011.01) |
| H04N 7/167 | (2011.01) |
| H04N 21/81 | (2011.01) |

(52) U.S. Cl.
CPC .................................. H04N 21/812 (2013.01)

(58) Field of Classification Search
CPC .......... H04N 21/25891; H04N 21/812; H04N 2007/17372; H04H 60/43
USPC ..................... 725/13–14, 16, 34, 36
See application file for complete search history.

(56) References Cited

U.S. PATENT DOCUMENTS

| | | | | |
|---|---|---|---|---|
| 6,868,525 | B1 * | 3/2005 | Szabo ........................... | 715/738 |
| 8,365,227 | B2 * | 1/2013 | Xue et al. ...................... | 725/46 |
| 2007/0220114 | A1 * | 9/2007 | Kaarela et al. ................ | 709/219 |
| 2007/0220575 | A1 * | 9/2007 | Cooper et al. ................ | 725/118 |
| 2008/0126226 | A1 * | 5/2008 | Popkiewicz et al. ........... | 705/27 |
| 2009/0037355 | A1 * | 2/2009 | Brave et al. .................... | 706/45 |
| 2009/0292587 | A1 * | 11/2009 | Fitzgerald ...................... | 705/10 |

* cited by examiner

*Primary Examiner* — Sumaiya A Chowdhury
(74) *Attorney, Agent, or Firm* — David H. Judson (57) ABSTRACT

The techniques disclosed herein facilitate online audience targeting based on brand and product interest/enthusiasm as determined by a measurement metric that is a function of one of more (and preferably all) of the following: recency data, frequency data, intensity data, consumption data, site data, meta data related to given videos, data, and other demographic data.

7 Claims, 8 Drawing Sheets

| | $S_1$ | $S_2$ | $S_3$ | $S_4$ |
|---|---|---|---|---|
| $S_1$ | 1 | $p(S_1\|S_2)/p(S_1)$ | $p(S_1\|S_3)/p(S_1)$ | $p(S_1\|S_4)/p(S_1)$ |
| $S_2$ | $p(S_2\|S_1)/p(S_2)$ | 1 | $p(S_2\|S_3)/p(S_2)$ | $p(S_2\|S_4)/p(S_2)$ |
| $S_3$ | $p(S_3\|S_1)/p(S_3)$ | $p(S_3\|S_2)/p(S_3)$ | 1 | $p(S_3\|S_4)/p(S_3)$ |
| $S_4$ | $p(S_4\|S_1)/p(S_4)$ | $p(S_4\|S_2)/p(S_4)$ | $p(S_4\|S_3)/p(S_4)$ | 1 |

| VIDEOS VIEWED PER VIEWER | FREQUENCY (NUMBER OF VIEWERS) | RELATIVE FREQUENCY | CALCULATION |
|---|---|---|---|
| 0 | 0 | 0% | 0% = (0/1990) * 100% |
| 1 | 232 | 12% | 12% = (232/1990) * 100% |
| 2 | 322 | 16% | 16% = (322/1990) * 100% |
| 3 | 456 | 23% | 23% = (456/1990) * 100% |
| 4 | 643 | 32% | 32% = (643/1990) * 100% |
| 5 | 213 | 11% | 11% = (213/1990) * 100% |
| 6+ | 124 | 6% | 6% = (124/1990) * 100% |

| SESSIONS/ UNIQUE | FREQUENCY (NUMBER OF OCCURRENCES) | RELATIVE FREQUENCY | CALCULATION |
|---|---|---|---|
| 1 | 55 | 42% | 42% = (55/131) * 100% |
| 2 | 32 | 24% | 24% = (32/131) * 100% |
| 3 | 12 | 9% | 9% = (12/131) * 100% |
| 4 | 8 | 6% | 6% = (8/131) * 100% |
| 5 | 21 | 16% | 16% = (21/131) * 100% |
| 6 | 3 | 2% | 2% = (3/131) * 100% |

| VIDEOS/ SESSION | FREQUENCY (NUMBER OF SESSIONS WHERE THIS OCCURS | RELATIVE FREQUENCY | CALCULATION |
|---|---|---|---|
| 0 | 0 | 0% | 0% = (0/131) * 100% |
| 1 | 55 | 42% | 42% = (55/131) * 100% |
| 2 | 32 | 24% | 24% = (32/131) * 100% |
| 3 | 12 | 9% | 9% = (12/131) * 100% |
| 4 | 8 | 6% | 6% = (8/131) * 100% |
| 5 | 21 | 16% | 16% = (21/131) * 100% |
| 6+ | 3 | 2% | 2% = (3/131) * 100% |

IDENTIFICATION OF USER SEGMENTS BASED ON VIDEO VIEWERSHIP ACTIVITY AND ANALYSIS

This application includes subject matter that is protected by copyright.

This application is based on and claims priority to Ser. No. 61/293,327, filed Jan. 8, 2010.

BACKGROUND OF THE INVENTION

1. Technical Field

The present invention relates generally to Internet video audience behavior measurement, consumption, tracking, and reporting.

2. Description of the Related Art

Many destination web sites and aggregators offer web-based services that host videos for content publishers and that allow audiences to directly consume those video clips either on their websites, or via other sites, blogs, or social networks to which their content is linked and or embedded. To be successful, it is desirable for site owners to understand their audience and their consumption habits so that a site's appeal and stickiness to end users and others (such as potential advertisers) can be tracked, managed, and optimized. Additionally, video and rich media formats are being used more and more for interactive advertising campaigns. Creatives that are provided in such formats need to be measured for audience behavior as well to ascertain the effectiveness of such campaigns.

Behavioral targeting has long held the promise of improving the delivery of suitable advertising to a specific consumer. Traditional methods of behavioral targeting online generally involve tracking which websites and which web pages a web user visits, and then utilizing this information to infer things about the user, such as the user's level of interest in buying a car, the user's interest in given information, and the like.

BRIEF SUMMARY

This disclosure relates to behavioral targeting based on a deep analytics into user behavior around video (viewing patterns) combined with an approach to categorizing and organizing videos into relevant segments related to brands, products, activities, lifestyles or otherwise. The technique enables targeting of users based on their video viewing patterns and the content and subject matter of the videos they watch.

Preferably, the technique leverages "learning" user-targeting and scoring algorithms that combine various inputs, such as the number of videos consumed, how recently these videos were consumed, the subject matter of the videos, the intensity and engagement patterns of the interaction that the user had with the videos, as well as relevant metadata around the videos including, without limitation, the channels on which the videos were shown, the environment of the user platform (web, mobile, or otherwise) on which the videos were watched, and the users themselves (if no permission, then no personally identifiable information used; with permission, user profile information then is leveraged to improve targeting).

In this manner, a user can be identified as a target user of interest and be served an advertisement in conjunction with watching videos on one or more sites or as he or she visits other sites distinct from those where videos were watched.

The techniques disclosed herein facilitate online audience targeting based on the "enthusiasm" they exhibit for a particular brand, product, activity, interest or other criteria. Preferably, enthusiasm is determined by one or more algorithms that are a function of one or more (and preferably all) of the following: recency data, frequency data, consumption data, intensity data, site data, content data, meta data related to the videos and related content, and other demographic data.

The techniques disclosed herein provide a novel technique to segment and target an audience brand/interest/product enthusiasm based on video viewing behavior across video, sites, and the like, in a privacy-compliant manner.

The foregoing has outlined some of the more pertinent features of the invention. These features should be construed to be merely illustrative. Many other beneficial results can be attained by applying the disclosed invention in a different manner or by modifying the invention as will be described.

DETAILED DESCRIPTION OF THE PREFERRED EMBODIMENT

Marketers are always searching for better and more effective ways of reaching their target audience. It would be desirable to provide a new type of targeting that can enable the identification of users who may (but need not) be "enthusiasts" of a particular brand, in-market buyers for a particular product, or practitioners of a particular activity (or other use case where audiences exhibiting a particular level of enthusiasm or interest is being targeted). Preferably, the identification of such enthusiasts is carried out by tracking and analyzing video viewing habits, as will be described.

"Enthusiast marketing," for example, can provide significant benefits. As an example, if an advertising (ad) targeting system could identify users who were very interested in a certain product or brand, e.g., a user who is very interested in a specific Lexus automobile, that information might be leveraged in many useful ways. Thus, e.g., the manufacturer itself (Lexus) could demonstrate "gratitude" and offer some sort of loyalty incentive. A competitor (e.g., Audi) might like to be "considered" as an alternative option for later purchase and could thus provide some comparative advertisement. Lastly, if an entity (e.g., a specific dealership) is interested in converting that user to become a customer, it could employ "conquest marketing" (or other such) techniques in an effort to convert the interest to a real purchase. All of these options, and many more, could be available to marketers and the agencies that serve them if they had the ability to more granularly and accurate identify user interest, segments, enthusiasm, and behavior. The approach for leveraging video viewing data that is now described enables this type of improved targeting.

Figure 1:
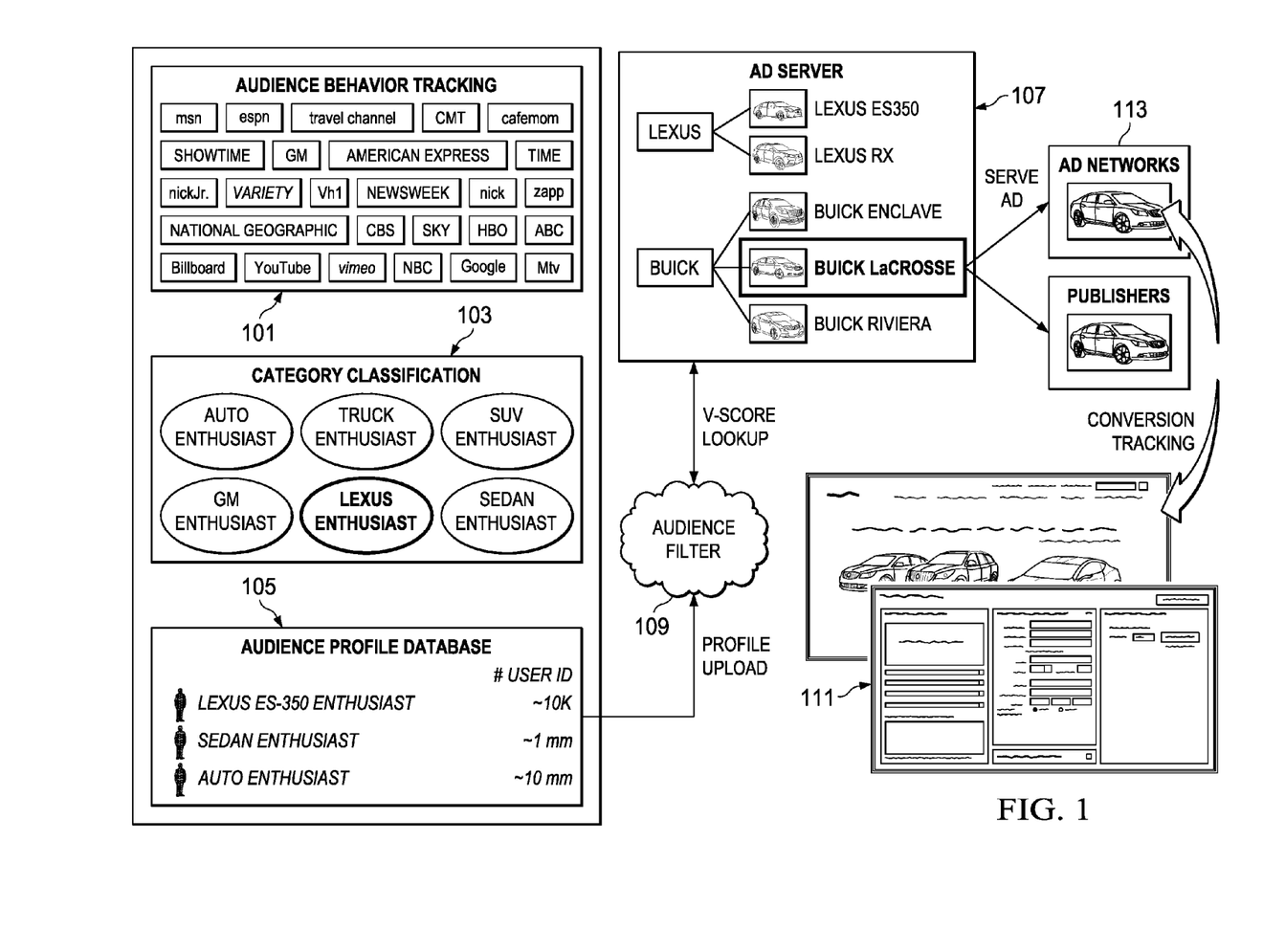
FIG. 1 is a block diagram of an audience tracking system for use to provide behavioral targeting according to the subject matter herein.

As seen in FIG. 1, an audience tracking system as described herein provides the high-level functions including audience behavior tracking 101 and category classification 103, with the result being an audience profile database 105. The database stores data in the form of a unique algorithm calculation (preferably based on many inputs) referred to herein as a VScore. This designation is provided solely for convenience of explanation and not by way of limitation. In general, a VScore can be thought of as a measure of how strongly a user is interested in a particular thing, whether it is a brand, a product, an activity or otherwise. One possible use case of this VScore data would be as follows; Ad server(s) 107 access the audience tracking system through an audience filter 109 to obtain an audience profile based on a VScore, which profile is then used to inform the ad server as to which ad or ads should be delivered to the ad network or publisher that will display the ad or cause the ad to be displayed to the user.

Figure 2:
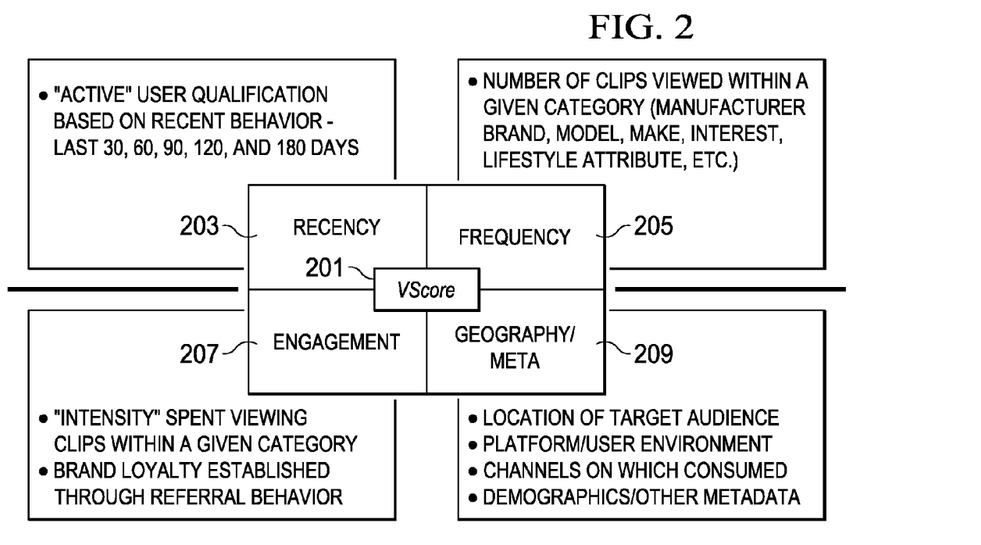
FIG. 2 illustrates how a measurement metric is generated according to the techniques herein.

As seen in FIG. 2, a VScore 201 preferably is influenced by a number of factors, including, without limitation, recency data 203, frequency data 205, engagement data 207, content metadata, site data, and other demographic data (e.g., geography or other metadata 209). It is not required that data from each factor is included to generate the VScore, but in a preferred embodiment this is the case. Generally, recency data 203 is a measure of how "active" the user has been based on his or her recent video viewing behavior over given time periods (e.g., 1, 2, 30, 60, 90, 120 and 180 days). The frequency data 205 measures a number of video clips viewed within a given category (e.g., manufacturer's brand, model, make, interest, lifestyle attribute, and the like). The engagement data 207 measures intensity, such as how long the user spent viewing clips within a given category, brand loyalty (e.g., established through referral behavior), what actions the user took within a session, and the like. The geography and other metadata 209 measures the location of the target audience, the user's platform or other local environment, the channels on which the videos have been consumed, and other demographic data and metadata (e.g., title, content type) if available.

As a skilled artisan will appreciate, analysis and categorization of the content/advertising viewed is critical to understanding the interests and intent of the users. Ideally, a targeting system such as this should take into account videos that are: user generated, professionally-generated or otherwise; advertisements, editorial content, news, or otherwise; original versions of content, copies of the originals, or derivatives, remixes, mash-ups, user reviews, fan-submitted videos, and the like. Essentially, if all such videos are tagged and categorized appropriately, and all the viewing behavior against these videos is similarly organizing and analyzed, the resultant data can provide insights into the interests/intent and characteristics of the viewing audience. This is the goal of the subject matter disclosed herein.

One of the important implications of this type of targeting system is that essentially all video on the web can have value. Currently, a significant percent of web video clips are "user-generated" (UGC) and as such are not generally easily monetizable. These videos, however, often contain by their nature tremendous information about the passions and interests of their creators, viewers and distributors. These videos, as well as others—together with related content/tweets/blog posts, etc.—all can provide the inventive system relevant data to be used for algorithmic learning about audience enthusiasm.

FIG. 1 illustrates how the inventive targeting technique may be employed. Of course, it is assumed that users watch videos (in this case, videos preferably are watched all across the web, on any internet-enabled device). This user behavior is monitored by a measurement and analytics system (as will be described below) and tracked against which content was watched, where it was watched, when, in what type of environment, how it was watched, and so forth. This is the audience behavior tracking 101. Next, content and advertising are organized into segments, preferably based on the content, target segment, or other metadata associated with the content. This is the category classification 103. Some examples would include organizing videos based on which products they reference, or which types of activities are featured. Thereafter, one or more audience profiles are developed, e.g., and these profiles are based upon many inputs and involve algorithms that are improved and trained over time based upon feedback mechanisms. The profiles are generated and stored in the database 105. The data points that could be leveraged in calculations may include one or more of: recency, frequency, intensity, consumption, content, user metadata, and the like, which are used by the VScore calculation, as has been described. The audience profile data and scoring are then called by an ad server 107 or ad network 113 to determine if the user is of a particular type or should be served a particular type of ad (in this case, show a Ford ad to an enthusiast of a competing brand). The resultant user activity is then tracked, by conversion tracking system 111, to provide feedback into the system for enhancement.

The advertising server (ad server), on-line advertising network (ad network), and conversion tracking systems referenced in FIG. 1 are well-known in the prior art. Familiarity with such technologies, systems, and business models are assumed in this disclosure.

To truly gather behavioral data at scale, preferably the system monitors the viewing behavior of large numbers (e.g., millions) of users across hundreds or thousands of video properties for millions of videos, and billions of events and data points. With all this data for this many users, it is desirable to develop a set of algorithms that can help categorize the video content viewed and the users doing the viewing. This is the purpose of the VScore calculation algorithm, which factors in many data points to determine how much a user is interested in a particular thing, whether it is a brand, a product, activity or otherwise.

This widespread measurement of users and content provides highly relevant data. As mentioned previously, preferably the VScore combines such items as an understanding of the content, the user, the environment, viewing patterns over time, as well as the channels across which the content is viewed; the algorithm then looks at the intersections of such various data.

Figure 3:
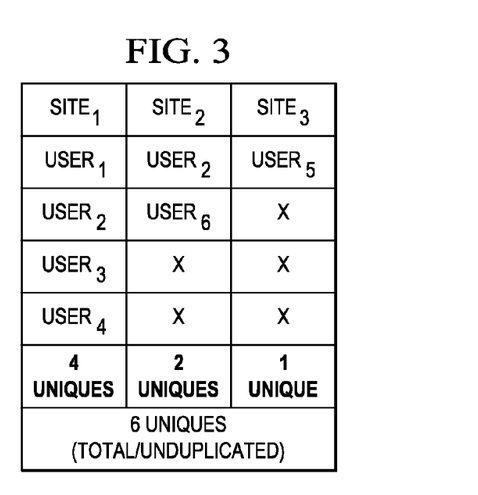
FIG. 3 illustrates how an audience overlap analysis tool identifies unduplicated unique users.
Figure 4:
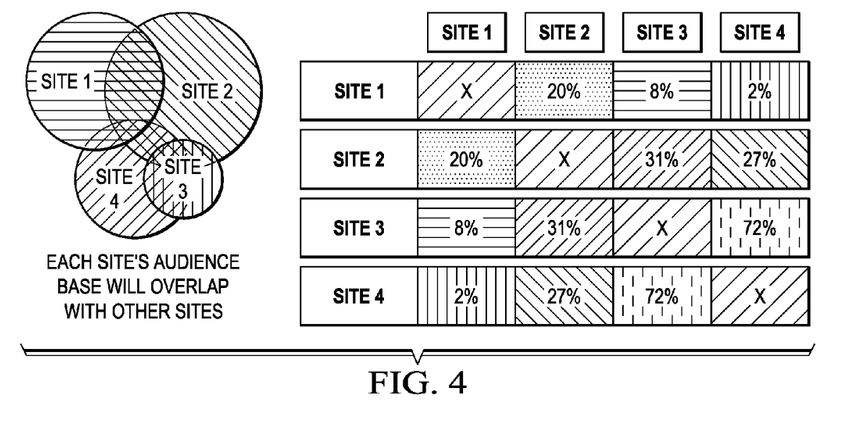
FIG. 4 illustrates how an audience overlap analysis tool generates a cross-site matrix.

Many different types of audience analysis tools may be used in accordance with this invention to analyze behaviors at a "user" dimension. An audience overlap analysis identifies what audiences from other sites come to a particular site, e.g., "People who watch on Site$_x$ also watch on Site$_y$." As seen in FIG. 3, a first aspect of an audience overlap analysis is to identify unduplicated "uniques." In particular, given a site (or a domain, or sub-domain, etc.), or a collection of sites, the system obtains a list of users who have visited the site or sites. A baseline set may also be used. As indicated in the table of FIG. 3, the system then compares user lists to determine the total uniques and the uniques per list. Another aspect of audience overlap may involve an investigation of cross-site overlap, based on the premise that viewers may be more likely to convert if they view videos on specific "pairs" of sites. This type of audience overlap analysis evaluates which site pairs drive the highest conversion rates. To that end, an analysis involves creating an "n×n" matrix of all sites mapped against one another. Each "cell" in the matrix then represents the overlapping audience of a first Site and a second Site. Then, analyze common metrics for pairs of sites (overlapping audience behavior) with respect to one or more of: viewers, views, engagements, viewing time, percentage completion, conversions, and the like. The goal of the technique is to determine what "packages of sites address similar audiences. An example matrix is shown in FIG. 4.

Another technique for audience analysis utilizes so-called "Content Affinities," which determine what sites have audiences that have strong affinity to a given site. One way of describing this concept is that "Affinity is the increased likelihood of viewing on $Site_x$ given went to $Site_y$." Content Affinities, as the name implies, are causal relationships between content types, such as the following illustrative example: "People who like content of type X also like content of type Y." The VScore algorithm can make use of such data in the following, non-limiting manner. Assume by way of example that the following affinity assertions/data is available to the system:

"People who like X also like Y"

"Probability of viewing content on $Site_x$ is p(Sx)=Total views on $Site_x$/Total views on all sites"

"Probability of viewing content on $Site_y$ is P(Sy)=Total views on $Site_y$/Total views on all sites"

"Probability of viewing on $Site_x$ & $Site_y$ is p(Sx & Sy)=Total views on $Site_x$ & $Site_y$/Total views on all sites"

"Probability of viewing on $Site_x$ given viewed on $Site_y$ is $p(S_x|S_y)=p(S_x \& S_y)/p(S_y)$, which is also equal to $(p(S_x) \times p(S_y|S_x))/p(S_y)$"

Therefore, Affinity=$p(S_x|S_y)/p(S_x)$

Figure 5:
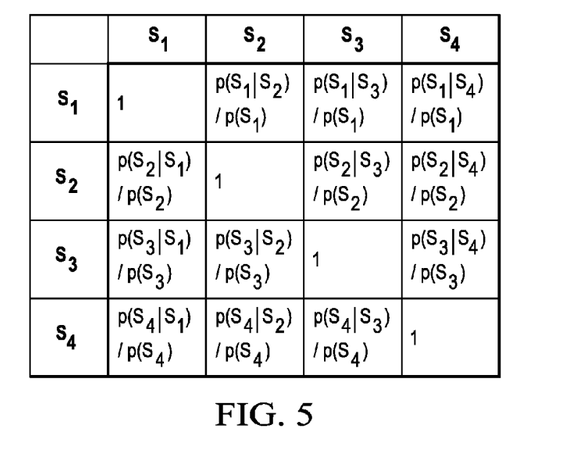
FIG. 5 is a representative content affinities matrix generated by an audience analysis tool.

Based on these assertions, an affinity matrix is then developed, as shown in FIG. 5. For a given site, the affinity matrix is used to develop a pareto graph of its "row."

Figure 6:
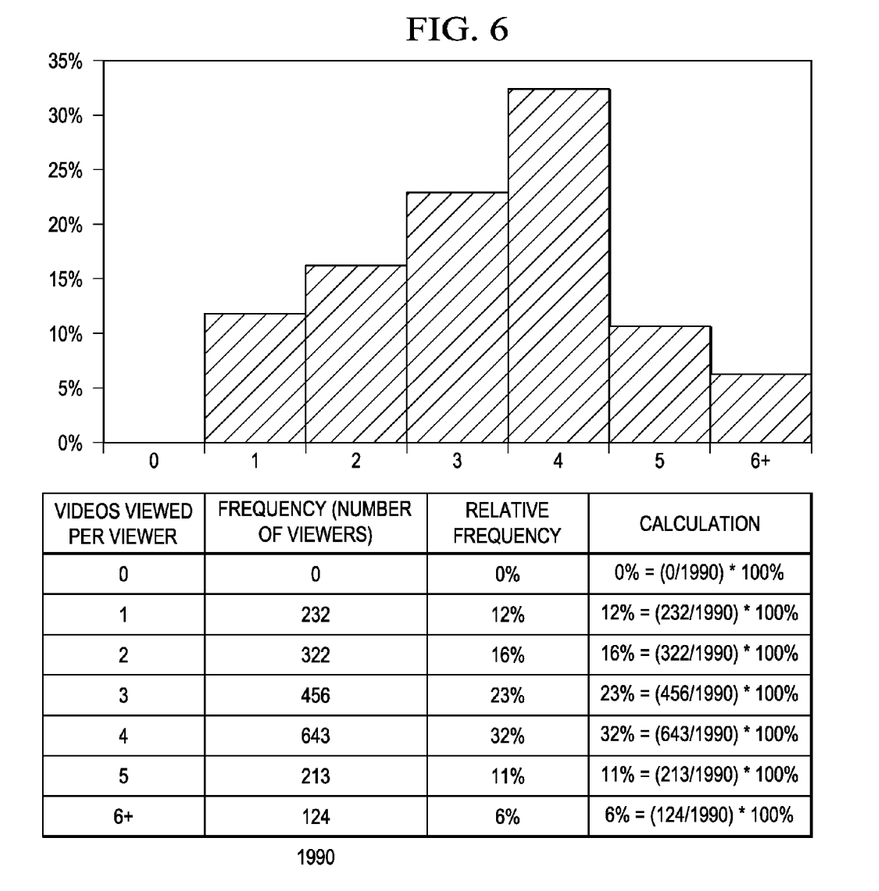
FIG. 6 illustrates a first view of segmentation of usage intensity, which is data representing relevant videos viewed per user.
Figure 7:
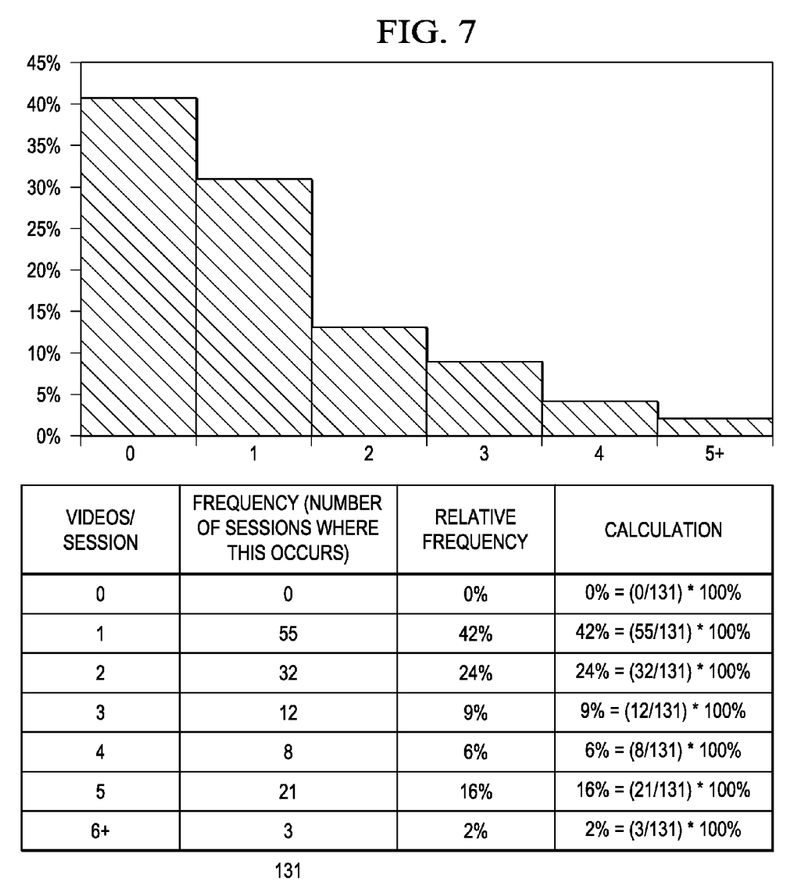
FIG. 7 illustrates a second view of segmentation of usage intensity, based on sites on which relevant videos are viewed per viewer.
Figure 8:
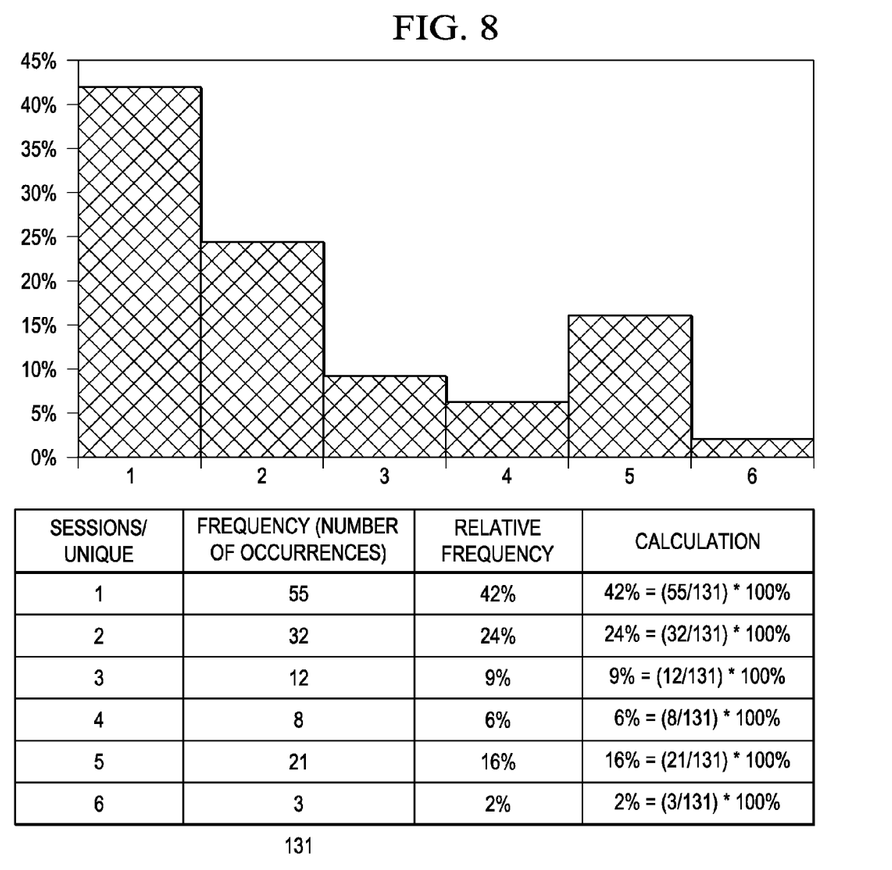
FIG. 8 illustrates a third view of segmentation of usage intensity, based on sessions per unique viewer.
Figure 9:
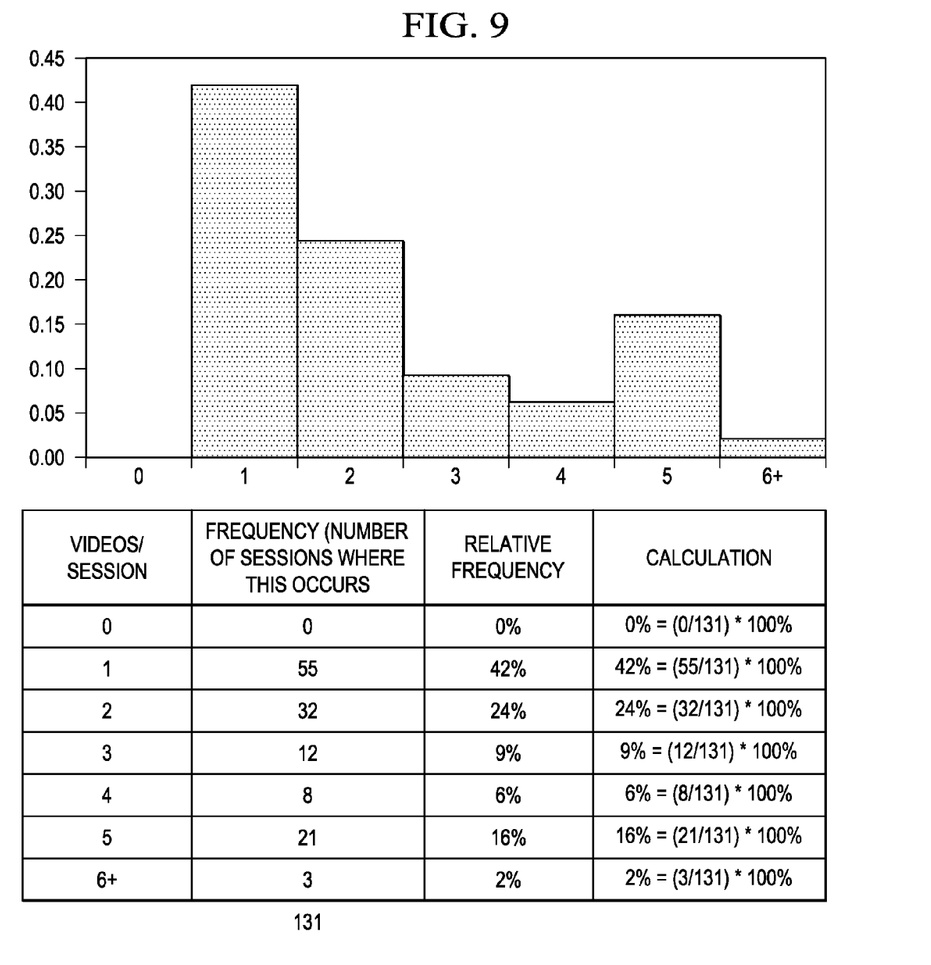
FIG. 9 illustrates a fourth view of segmentation of usage intensity, based on videos viewed session.

Another form of audience analysis is audience "segmentation," which groups visitors into (monetizable) buckets based on their activities, e.g., to attempt to identify high versus low intensity users. This determination may be made based on what patterns each exhibit. Thus, for example, a set of "usage intensity" segmentations of a viewer across many videos and channels may be generated. This information can then be viewed in many different ways, such as, without limitation, relevant videos viewed per user (FIG. 6), sites on which relevant videos are viewed (FIG. 7), sessions per user (FIG. 8), and videos viewed per session (FIG. 9). Using this approach, a given user may be characterized as "low" (passerby), "medium" (regular) or "high" (enthusiast). Audience segmentation may be investigated on any meta data attribute (per account, per content type, etc.) by identifying behaviors for viewers in each identified "segment" (or "bucket"). The "usage intensity" segmentation is not meant to be limiting, as other techniques, such as content affinity segmentation, may be used as well.

This approach provides deep analytics into user behavior around video (viewing patterns). These analytics are then combined with an approach to categorize and organize videos into relevant segments related to brands, products, activities, lifestyles or otherwise. The resulting metric is a VScore, which is then adapted into a "profile" that is used to facilitate targeting of users based on their video viewing patterns and the content and subject matter of the videos they watch.

The VScore algorithm combines various inputs, such as the number of videos consumed, how recently these videos were consumed, the subject matter of the videos, the intensity and engagement patterns of the interaction that the user had with the videos, as well as relevant metadata around the videos including, without limitation, the channels on which the videos were shown, the environment of the user platform (web, mobile, or otherwise) on which the videos were watched, and the users themselves (with or without PII depending on permission). In this manner, a user can be identified as a target user of interest and be served an advertisement in conjunction with watching videos on one or more sites or as he or she visits other sites distinct from those where videos were watched.

Figure 10:
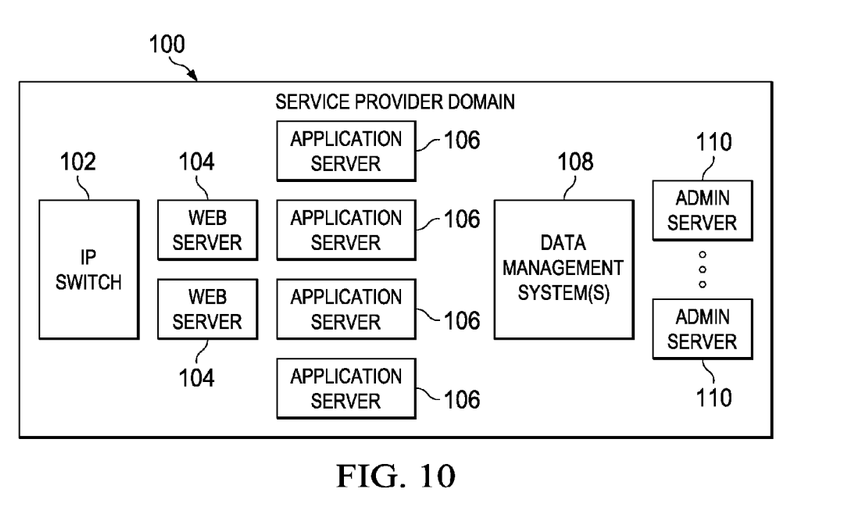
FIG. 10 is an illustrative service provider infrastructure that provides analytics as a managed service.

A service provider or system architecture may be used to implement the audience tracking system. FIG. 10 illustrates a representative service provider or system architecture, which in one embodiment is implemented in or across one or more data centers. A data center typically has connectivity to the Internet. The system provides a preferably web-based hosted solution through which service customers (e.g., advertisers, content publishers, publishing networks, site owners, video owners, and the like) view Internet video and rich media end user experience analytics in an online manner. Participants may interact with the platform as a hosted service. In an alternative embodiment, the system may be implemented over a private network, or as a product (as opposed to a hosted or managed service).

A user of the service (e.g., an advertiser, content publisher, publishing network, site owner, or the like) has an Internet accessible machine such as a workstation or notebook computer. Typically, the user accesses the service provider architecture by opening a web browser on the machine to a URL associated with a service provider domain or sub-domain. The user then authenticates to the managed service in the usual manner, e.g., by entry of a username and password. The connection between the machine and the service provider infrastructure may be encrypted or otherwise secure, e.g., via SSL, or the like. Although connectivity via the publicly-routed Internet is typical, the user may connect to the service provider infrastructure over any local area, wide area, wireless, wired, private or other dedicated network. As seen in FIG. 10, the service provider architecture 100 comprises an IP switch 102, a set of one or more web server machines 104, a set of one more application server machines 106, a database management system 108, and a set of one or more administration server machines 110. A representative web server machine 104 comprises commodity hardware (e.g., Intel-based), an operating system such as Linux, and a web server such as Apache 2.x. A representative application server machine 106 comprises commodity hardware, Linux, and an application server. The database management system 108 may be implemented as an Oracle database management package. In a high volume use environment, there may be several web server machines, several application server machines, and a number of administrative server machines. Although not shown in detail, the infrastructure may include a name service, other load balancing appliances, other switches, network attached storage, and the like. The system typically will also include connectivity to external data sources, such as third party databases. Each machine in the system typically comprises sufficient disk and memory, as well as input and output devices. Generally, the web servers 104 handle incoming business entity provisioning requests, and they export a display interface that is described and illustrated in more detail below. The application servers 106 manage the data and facilitate the functions of the platform. The administrator servers 110 handle all back-end accounting and reporting functions. The particular hardware and software implementation details described herein are merely for illustrative purposes are not meant to limit the scope of the present invention.

Figure 11:
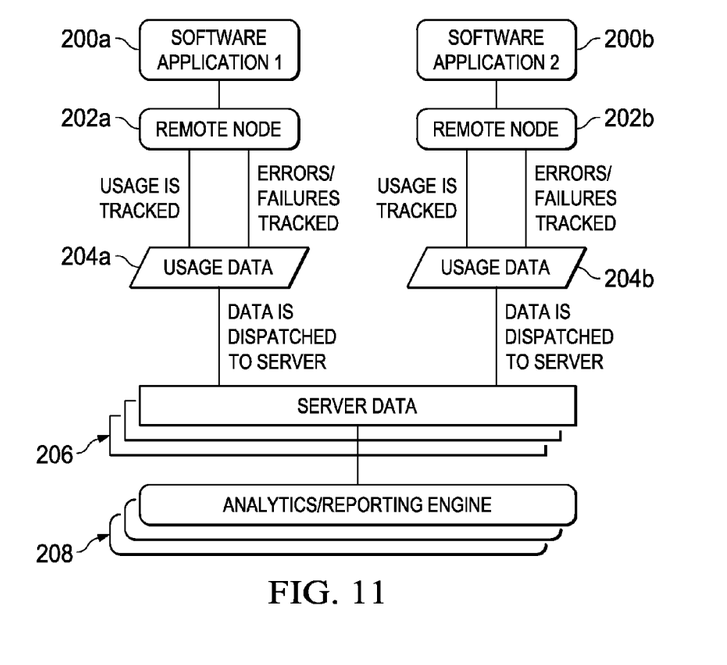
FIG. 11 is an illustrative system for collecting end user video viewing usage data.

As noted above, preferably the system includes a measurement and analytics system. FIG. 11 illustrates a basic operation of an Internet video experience measurement service that may be used for this purpose, although this implementation is not meant to be limiting. In this example, end user video players 200*a* and 200*b* have been instrumented with a usage monitoring API. The usage monitoring API is sometimes referred to as a remote node. Thus, video player 200*a* has associated therewith the remote node 202*a* and video player 200*b* has associated therewith the remote node 202*b*. Of course, the use of two instances is merely illustrative, as the system is designed to provide a highly scalable distributed logging service wherein a large number of instances of the video player or rich media application are instrumented and tracked. In operation, the remote node 202*a* generates usage data set 204*a*, and remote node 202*b* generates usage data set 204*b*. This usage data is transported to a central server (or to a set of servers), where the data sets are aggregated (reference numeral 206) and processed within an analytics and reporting engine 208.

Although not required, a usage monitoring API may be instrumented into (or otherwise associated with) a video player to collect end user usage data. A representative video player is a Flash video player, although the principles of this disclosure are not so limited, as the techniques described herein may be implemented in any type of player. For Flash video players, a monitoring component, preferably packaged as an extension, is installed in the video player (e.g., using the Macromedia Extension Manager). This component is implemented as an ActionScript library that provides application programming interfaces (APIs) for developers to integrate their players with the tracking mechanisms of this disclosure. In one embodiment, developers directly insert relevant stubs into the code to track whichever events they are interested in. Using the monitoring system, events are dispatched, aggregated automatically, processed, and reported. With this approach (the remote node implemented as API calls), developers are afforded control over the events and the level of granularity they wish to track. An instrumented player typically collects data about "system" events and "user" events. System events occur, for example, when a player is loaded, when a video is loaded into the player, when the video begins playing, when the video is paused, when the video finishes scrubbing (i.e., after it is forwarded or rewound), or when the video ends. User events occur, for example, when the user hits the pause button, scrubs the playhead (i.e., move the clip forward or backward), ends the scrub (i.e., stops moving the clip forward or backward), emails the video or clicks a button to get a video's embed code, or the like. In this approach, a set of ActionScript methods are called whenever a system or user event occurs. When an event occurs, API methods typically are combined with one another. A system event and a user event often occur simultaneously and might require two API methods be called at once. A Statistics Collector Timer (SCT) keeps track of a clip's playhead to ensure that accurate metrics are calculated. When a clip is paused, the SCT is paused. When a clip is scrubbed, the SCT is informed of the playhead's new position. The one or more system or user events are heard using ActionScript event listeners. An event listener is a piece of code that listens for a defined event and invokes the API method associated therewith.

Preferably, the system has the capability for tracking video viewing behavior of an individual viewer for instrumented video players across given video sites, given content owners, all video players, all versions of video players, and all browser types and all browser versions. Preferably, a single tracking component is used for all sites, content, players, and browsers, and preferably a globally unique identifier for each user is used to track each user's activity.

The hardware and software systems in which the invention is illustrated are merely representative. The invention may be practiced, typically in software, on one or more machines. Generalizing, a machine typically comprises commodity hardware and software, storage (e.g., disks, disk arrays, and the like) and memory (RAM, ROM, and the like). The particular machines used in the network are not a limitation of the present invention. A given machine includes network interfaces and software to connect the machine to a network in the usual manner. As illustrated in FIG. 8, log server may be part of a managed service (e.g., in an ASP model) using the illustrated set of machines, which are connected or connectable to one or more networks. More generally, the service is provided by an operator using a set of one or more computing-related entities (systems, machines, processes, programs, libraries, functions, or the like) that together facilitate or provide the inventive functionality described above. In a typical implementation, the service comprises a set of one or more computers. A representative machine is a network-based server running commodity (e.g. Pentium-class) hardware, an operating system (e.g., Linux, Windows, OS-X, or the like), an application runtime environment (e.g., Java, .ASP), and a set of applications or processes (e.g., Java applets or servlets, linkable libraries, native code, or the like, depending on platform), that provide the functionality of a given system or subsystem. As described, the service may be implemented in a standalone server, or across a distributed set of machines. Typically, a server connects to the publicly-routable Internet, a corporate intranet, a private network, or any combination thereof, depending on the desired implementation environment.

The hosted service may be implemented in a multi-server cluster environment that is designed to scale efficiently. Each server is designated with a primary and secondary series of tasks. Preferably, one server is dynamically set to be a master server, which server determines the secondary tasks to be performed by all servers. All servers update their existence within a database, and the servers cooperate to determine which server will be the master. The servers in the cluster are assigned tasks (such as log import and event processing) by the master server.

Having described the invention, what is now claimed is set forth below.

The invention claimed is:

1. Apparatus, comprising:
    a processor;
    computer memory holding computer program instructions that are executed by the processor, comprising:
        program code to receive video viewing data;
        program code to use the received video viewing data to determine an enthusiasm metric for one of: a particular brand, a product, an activity, and an interest, the enthusiasm metric being based on recency data, frequency data, and engagement data, the recency data being a measure of how active a user has been in video viewing behavior over one or more given recent time periods, the frequency data being a measure of a number of video clips viewed by a user with a given category, and the engagement data being a measure of how long a user spent viewing video clips within a given category or what actions the user took while viewing video clips within a session, the enthusiasm metric being further based on an identification of what video sites have audiences that have a degree of content affinity as determined from at least one cross-video site data comparison; and program code to use the enthusiasm metric to obtain, from a set of audience profiles, a particular audience profile representing an enthusiast for the particular brand, product, activity or interest, the set of audience profiles representing different enthusiasm levels;

program code to provide the obtained audience profile for ad targeting.

2. The apparatus as described in claim 1 wherein the enthusiasm metric is also a function of data concerning location of a target audience for one or more video clips.

3. The apparatus as described in claim 1, wherein the video clips include user-generated video content.

4. The apparatus as described in claim 1 wherein the at least one cross-video site data comparison is one of: a probability of viewing particular content on a first site determined by dividing a number of views of the particular content on the first site by a total number of views of the particular content across one or more other sites that are distinct from the first site, and a probability of viewing the particular content on the first site, given that the particular content was also viewed on a second site distinct from the first site.

5. Apparatus, comprising:
a processor;
computer memory holding computer program instructions that are executed by the processor, comprising:
program code to receive video viewing data; and
program code to use the received video viewing data to generate an audience overlap metric, the audience overlap metric being one of: (i) with respect to a given video site, an identification of what audiences from other given video sites also come to the given video site to watch video clips; (ii) an identification of one or more pairs of video sites at which video clips are watched and that have generated a given conversion rate; and (iii) an identification of what video sites have audiences that have a degree of content affinity as determined from at least one cross-video site data comparison;

program code to use the audience overlap metric to generate an enthusiasm metric for one of: a particular brand, a product, an activity, and an interest;

program code to use the enthusiasm metric to obtain, from a set of audience profiles, a particular audience profile representing an enthusiast for the particular brand, product, activity or interest, the set of audience profiles representing different enthusiasm levels; and program code to provide the obtained audience profile for ad targeting.

6. The apparatus as described in claim 5 wherein the audience overlap metric also includes an identification of one or more usage intensity segments.

7. The apparatus as described in claim 5 wherein the at least one cross-video site data comparison is one of: a probability of viewing particular content on a first site determined by dividing a number of views of the particular content on the first site by a total number of views of the particular content across one or more other sites that are distinct from the first site, and a probability of viewing the particular content on the first site, given that the particular content was also viewed on a second site distinct from the first site.

\* \* \* \* \*